US009448749B1

United States Patent
Lee et al.

(10) Patent No.: US 9,448,749 B1
(45) Date of Patent: Sep. 20, 2016

(54) DETERMINING MULTIFUNCTION PRINTER LOCATION BASED ON USER LOCATION AND COMMON LOCATION

(71) Applicant: LEXMARK INTERNATIONAL, INC., Lexington, KY (US)

(72) Inventors: Brian Thomas Lee, Richmond, KY (US); Randall Scott Sparks, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 14/806,067

(22) Filed: Jul. 22, 2015

(51) Int. Cl.
*G06F 3/12* (2006.01)

(52) U.S. Cl.
CPC .......... *G06F 3/1217* (2013.01); *G06F 3/1273* (2013.01); *G06F 3/1293* (2013.01)

(58) Field of Classification Search
CPC ... G06F 3/1217; G06F 3/1273; G06F 3/1293
USPC .............................. 358/1.14, 1.15
See application file for complete search history.

(56) References Cited

U.S. PATENT DOCUMENTS

| | | | |
|---|---|---|---|
| 7,443,298 B2 | 10/2008 | Cole | |
| 2005/0174609 A1 | 8/2005 | Thurlow | |
| 2006/0044598 A1 | 3/2006 | Etelapera | |
| 2009/0300226 A1* | 12/2009 | Rubio | H04W 4/02 710/10 |
| 2012/0072595 A1 | 3/2012 | St. Laurent | |
| 2014/0055806 A1* | 2/2014 | Furukawa | G06F 3/1292 358/1.14 |
| 2014/0085663 A1* | 3/2014 | Kavanappillil | G06F 3/1226 358/1.15 |
| 2014/0111520 A1 | 4/2014 | Cline | |
| 2014/0320894 A1* | 10/2014 | Farthing | G06F 3/126 358/1.15 |
| 2015/0070725 A1* | 3/2015 | Monden | G06F 3/1226 358/1.15 |
| 2015/0092226 A1* | 4/2015 | Anderson | H04N 1/00244 358/1.15 |
| 2015/0146239 A1* | 5/2015 | Anderson | H04W 4/021 358/1.15 |

\* cited by examiner

*Primary Examiner* — Benny Q Tieu
*Assistant Examiner* — Juan M Guillermety (57) ABSTRACT

A method for determining imaging device locations within an organization includes determining a plurality of recent users of an imaging device based upon a user log thereof; identifying an assigned location of each of the plurality of recent users in the organization via communication with a user location directory; and associating a location of the imaging device to an area in the organization that is common among the assigned locations of the recent users.

20 Claims, 7 Drawing Sheets

| user id | date and time |
|---|---|
| Omar | 1/19/2015 10:00 |
| Kathy | 1/19/2015 10:05 |
| David | 1/20/2015 13:04 |
| Steve | 1/22/2015 07:03 |
| Arla | 1/22/2015 07:06 |
| Noah | 1/22/2015 07:14 |
| Hope | 1/22/2015 08:07 |
| Kate | 1/22/2015 08:13 |
| Sharla | 1/22/2015 08:30 |
| Noah | 1/22/2015 08:45 |
| Wanda | 1/22/2015 08:48 |
| Ann | 1/22/2015 09:05 |
| Holly | 1/22/2015 09:08 |
| Mary | 1/22/2015 09:55 |
| Matt | 1/22/2015 10:14 |
| Noah | 1/22/2015 11:34 |
| Sharla | 1/22/2015 12:55 |
| Kathy | 1/22/2015 13:00 |
| Wanda | 1/22/2015 14:07 |
| David | 1/23/2015 06:14 |
| Steve | 1/23/2015 06:17 |
| Hope | 1/23/2015 06:46 |
| Hope | 1/23/2015 07:03 |
| Arla | 1/23/2015 07:16 |
| Sharla | 1/23/2015 07:23 |
| Arla | 1/23/2015 07:34 |
| Hope | 1/23/2015 08:46 |
| Kathy | 1/23/2015 09:23 |
| Ann | 1/23/2015 10:19 |
| Arla | 1/23/2015 10:38 |
| Kate | 1/23/2015 11:10 |
| Kate | 1/23/2015 11:14 |
| Arla | 1/23/2015 11:17 |
| Mary | 1/23/2015 11:19 |

| user id | date and time |
|---|---|
| Wanda | 1/19/2015 08:11 |
| Ann | 1/19/2015 08:30 |
| Rob | 1/19/2015 08:41 |
| Hope | 1/19/2015 15:19 |
| Andy | 1/20/2015 07:45 |
| Rose | 1/20/2015 08:01 |
| Andy | 1/20/2015 08:34 |
| Julie | 1/20/2015 13:17 |
| Tim | 1/20/2015 14:24 |
| Pete | 1/20/2015 12:47 |
| Joe | 1/22/2015 08:33 |
| Omar | 1/22/2015 08:40 |
| Kathy | 1/22/2015 08:46 |
| Julie | 1/22/2015 09:05 |
| Andy | 1/22/2015 09:32 |
| Holly | 1/22/2015 10:10 |
| Mary | 1/22/2015 10:13 |
| Nate | 1/22/2015 10:34 |
| Joe | 1/22/2015 14:40 |
| Kathy | 1/22/2015 18:45 |
| Joe | 1/22/2015 19:30 |
| Joe | 1/22/2015 19:59 |
| Pete | 1/22/2015 20:05 |
| Ann | 1/23/2015 06:56 |
| Hope | 1/23/2015 07:45 |
| Rose | 1/23/2015 08:01 |
| Julie | 1/23/2015 08:34 |
| Tim | 1/23/2015 09:17 |
| Pete | 1/23/2015 09:24 |
| Holly | 1/23/2015 10:47 |
| Holly | 1/23/2015 11:33 |
| Holly | 1/23/2015 12:10 |
| Wanda | 1/23/2015 13:16 |
| Wanda | 1/23/2015 14:05 |
| Andy | 1/23/2015 18:32 |
| Pete | 1/23/2015 19:10 |
| Pete | 1/23/2015 19:13 |
| Holly | 1/23/2015 20:34 |
| Holly | 1/23/2015 21:46 |
| Andy | 1/23/2015 21:50 |

| | # of jobs | | assigned location | dept |
|---|---|---|---|---|
| Omar | 1 | | PODB2X | ACC |
| Kathy | 3 | | OFC2X | ACC |
| David | 2 | | PODB3X | ACC |
| Steve | 2 | 8 | PODB4X | ACC |
| Arla | 5 | | PODB1Z | SAL |
| Noah | 3 | | PODA2Z | SAL |
| Hope | 4 | | PODA3Z | SAL |
| Kate | 3 | | PODA1Z | SAL |
| Sharla | 3 | | PODB2Z | SAL |
| Wanda | 2 | | OFC1Z | SAL |
| Ann | 2 | 22 | OFC2Z | SAL |
| Holly | 1 | | POD1Y | FIN |
| Mary | 2 | | POD2Y | FIN |
| Matt | 1 | 4 | POD5Y | FIN |
| (14) | | 34 | | |

(502a points to # of jobs column)

FIG. 5B

| | # of jobs | | assigned location | dept |
|---|---|---|---|---|
| Wanda | 3 | | OFC1Z | SAL |
| Ann | 2 | | OFC2Z | SAL |
| Rob | 1 | | PODA4Z | SAL |
| Hope | 2 | 8 | PODA3Z | SAL |
| Andy | 5 | | PODA1X | ACC |
| Rose | 2 | | PODA2X | ACC |
| Julie | 3 | | PODA3X | ACC |
| Tim | 2 | | OFC1X | ACC |
| Pete | 5 | | PODA4X | ACC |
| Joe | 4 | | PODB1X | ACC |
| Omar | 1 | | PODB2X | ACC |
| Kathy | 2 | 24 | OFC2X | ACC |
| Holly | 6 | | POD1Y | FIN |
| Mary | 1 | | POD2Y | FIN |
| Nate | 1 | 8 | POD4Y | FIN |
| (15) | | 40 | | |

(502c points to # of jobs column)

| | # of jobs | assigned location | dept |
|---|---|---|---|
| Pete | 3 | PODA4X | ACC |
| Omar | 5 | PODB2X | ACC |
| Kathy | 7 | OFC2X | ACC |
| David | 5 | PODB3X | ACC |
| Steve | 5 | PODB4X | ACC |
| Andy | 2 | PODA1X | ACC |
| Rose | 2 | PODA2X | ACC |
| Noah | 1 | PODA2Z | SAL |
| Hope | 3 | PODA3Z | SAL |
| Ann | 1 | OFC2Z | SAL |
| Holly | 2 | POD1Y | FIN |
| Mary | 2 | POD2Y | FIN |
| Matt | 2 | POD5Y | FIN |
| Sara | 2 | POD3Y | FIN |

FIG. 6A - April 2014

| | # of jobs | assigned location | dept |
|---|---|---|---|
| Pete | 2 | PODA4X | ACC |
| Omar | 3 | PODB2X | ACC |
| Kathy | 6 | OFC2X | ACC |
| David | 4 | PODB3X | ACC |
| Steve | 5 | PODB4X | ACC |
| Andy | 1 | PODA1K | ACC |
| Arla | 1 | PODB1Z | SAL |
| Noah | 1 | PODA2Z | SAL |
| Hope | 2 | PODA3Z | SAL |
| Kate | 1 | PODA1Z | SAL |
| Ann | 1 | OFC2Z | SAL |
| Mary | 1 | POD2Y | FIN |
| Matt | 1 | POD5Y | FIN |
| Sara | 1 | POD3Y | FIN |

FIG. 6B – July 2014

| | # of jobs | assigned location | dept |
|---|---|---|---|
| Omar | 2 | PODB2X | ACC |
| Kathy | 5 | OFC2X | ACC |
| David | 3 | PODB3X | ACC |
| Steve | 4 | PODB4X | ACC |
| Andy | 1 | PODA1Z | ACC |
| Arla | 3 | PODB1Z | SAL |
| Noah | 1 | PODA2Z | SAL |
| Hope | 2 | PODA3Z | SAL |
| Kate | 2 | PODA1Z | SAL |
| Ann | 2 | OFC2Z | SAL |
| Sharla | 1 | PODB2Z | SAL |
| Mary | 1 | POD2Y | FIN |
| Matt | 2 | POD5Y | FIN |
| Sara | 1 | POD3Y | FIN |

FIG. 6C – October 2014

| | # of jobs | assigned location | dept |
|---|---|---|---|
| Omar | 1 | PODB2X | ACC |
| Kathy | 3 | OFC2 | ACC |
| David | 2 | PODB3X | ACC |
| Steve | 2 | PODB4X | ACC |
| Arla | 5 | PODB1Z | SAL |
| Noah | 3 | PODA2Z | SAL |
| Hope | 4 | PODA3Z | SAL |
| Kate | 3 | PODA1Z | SAL |
| Sharla | 3 | PODB2Z | SAL |
| Wanda | 2 | OFC1Z | SAL |
| Ann | 2 | OFC2Z | SAL |
| Holly | 1 | POD1Y | FIN |
| Mary | 2 | POD2Y | FIN |
| Matt | 1 | POD5Y | FIN |

FIG. 6D – January 2015

FIG. 7

DETERMINING MULTIFUNCTION PRINTER LOCATION BASED ON USER LOCATION AND COMMON LOCATION

FIELD OF THE INVENTION

The present invention relates to determining whereabouts of imaging devices and more particularly to associating locations of imaging devices to a location of users thereof.

BACKGROUND

In a managed print services (MPS) setting, there is always a need to know where an imaging device is situated amongst the fleet for a variety of purposes. Such purposes are mainly directed for fleet administrators to monitor supplies status and the overall condition of each imaging device for providing service and/or support when needed. As imaging devices may be moved from one location to another within an organization, there is a need to keep track of their movements. One method may be to manually locate and then input a new location of a particular imaging device on the organization's device directory. However, manually locating imaging devices within an organization is not only time-consuming for fleet administrators but also time-consuming for service technicians rendering services.

Another method for keeping track of movement of imaging devices within the organization would be to configure them to be "location-aware." Imaging devices, prior to inclusion to a fleet, are sometimes equipped with hardware technologies such as GPS and other real-time tracking systems (e.g., using location-enabled "tags") that enable the devices to notify one or more authorized parties in the organization of their real-time locations. Other known algorithms such as WiFi triangulation are also employed in addressing the issue of locating network-enabled imaging devices. However, implementation costs of each of these hardware technologies and methods are often expensive. These are also difficult to set up and maintain since imaging devices may be added or eliminated from the group. Outfitting imaging devices with these technologies may also prove ineffective as imaging devices in a fleet are relatively immobile and may be disposed at a certain location for a relatively long period of time for sharing by users in a particular area.

Accordingly, there is a need for more economical methods for determining locations of imaging devices within an organization. The need extends to detecting whether or not imaging devices have moved. Additional benefits and alternatives are sought when devising solutions.

SUMMARY

The above-mentioned and other problems are solved by systems and methods for determining locations of imaging devices in an organization based on locations of users thereof. In locating an imaging device, a user log which includes a plurality of recent users of the imaging device is generated. An assigned location of each recent user in the user log is then identified by connecting to a user location directory or database known to or kept by the organization. Assigned locations include at least an area or department in the organization where recent users are positioned. An area or department in the organization common among the assigned locations is then determined and is associated with a current location of the imaging device being searched for. In one representative embodiment, the technique may be performed by a server managing operations of imaging devices in an organization. Alternatively, an imaging device may be configured to self-report its location to the server or any requestor in the system. In this way, determining current locations of imaging devices is based on user location information typically available within organizations. Software, executable code, interfaces, and computing system environments typify the embodiments.

Other embodiments note techniques for detecting whether or not an imaging device has been moved by tracking a number of new users referring to users assigned in areas in the organization unlike a latest identified location of the imaging device.

These and other embodiments set forth in the description below. Their advantages and features will become readily apparent to skilled artisans. The claims set forth particular limitations.

BRIEF DESCRIPTION OF THE DRAWINGS

FIGS. 4A and 4B show user logs associated with imaging devices of FIGS. 3A and 3B, respectively;

DETAILED DESCRIPTION OF THE ILLUSTRATED EMBODIMENTS

In the following detailed description, reference is made to the accompanying drawings where like numerals represent like details. The embodiments are described in sufficient detail to enable those skilled in the art to practice the invention. It is to be understood that other embodiments may be utilized and that changes may be made without departing from the scope of the invention. The following detailed description, therefore, is not to be taken in a limiting sense and the scope of the invention is defined only by the appended claims and their equivalents. In accordance with the features of the invention, systems and methods teach determining locations of imaging devices based on locations of users thereof.

Figure 1:
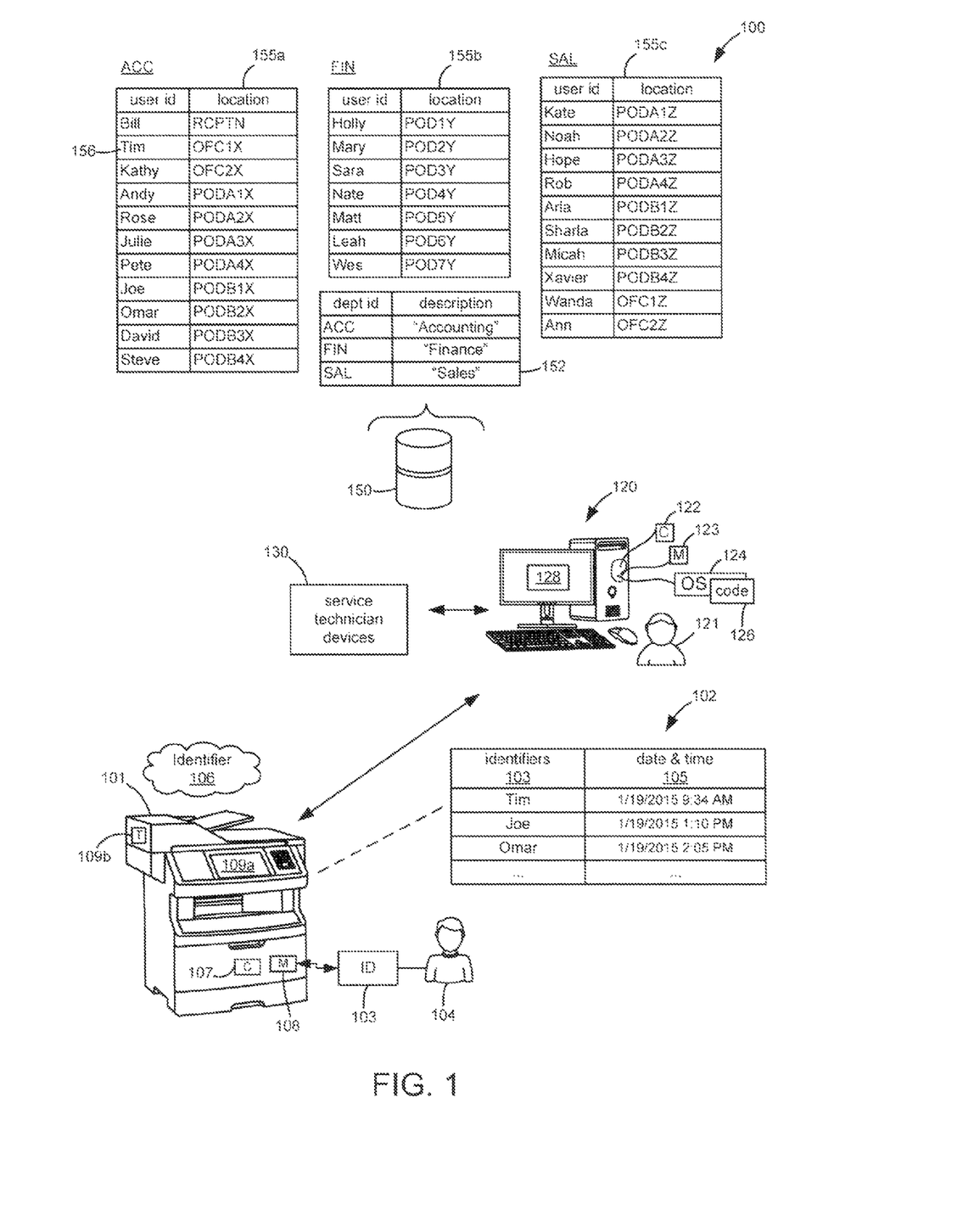
FIG. 1 is a diagrammatic view of a computing system environment for determining a location of imaging devices based on users thereof.

FIG. 1 shows system 100 for determining a location of imaging device 101 within an organization, such as, for example, an office building. Imaging device 101 has user log 102 associated therewith, which includes, at least user identifiers 103 corresponding to user 104 performing imaging operations on imaging device 101, and date and time 105 the operations were performed. Imaging device 101 may be connected to database 150 containing a user location directory. In determining a current location of imaging device 101, an assigned location of each user in the log is referenced in the user location directories 155a, 155b, 115c of database 150.

A server 120 monitored by an administrator 121 is connected to a plurality of imaging devices 101. Imaging devices 101 are dispersed across different areas in the organization. Server 120 keeps user logs 102 and communicates with database 150 for the assigned locations of each user on the user log. Upon determination of the assigned user locations, the current location of the imaging device is associated with an area or department in the organization common among the assigned user locations. Since user locations and areas in the organization are typically known and user logs are often employed in organizations to track device usage and/or servicing needs, an association of recent users on an imaging device and the device's current location in the organization can be established. For example, if recent users "Tim," "Joe" and "Omar" of the user log 102 are each known in database 150 to work in the "Accounting" department, imaging device 101 can be also said to be located in the Accounting department of the organization. While this example serves to illustrate the concept of locating imaging devices based on recent users, more complex examples will be illustrated below.

As will be known in the art, imaging device 101 is recognized in the organization via its corresponding imaging device identifier 106 and like any other device includes thereon controller 107, memory 108, and user interfaces 109a (touch screen), 109b (user tag identifier). Similarly, server 120 includes controller 122, memory 123, and operating system 124. Server 120 is capable of identifying a general condition of imaging device 101 or status of supplies thereon, operations that imaging device 101 is configured to perform, and other administrative processes.

Server 120 may include code 126, operative to be activated to perform the steps of the present disclosure. Code 126 may reside on operating system 124 of server 120. Code 126 is activated to perform the aforementioned steps of determining respective locations of imaging devices in the organization, such as a location of imaging device 101.

In system 100 of FIG. 1, other computing devices may be connected to imaging device 101, database 150, and/or server 120, such as laptop computers, smartphones, workstation computers, and like computing devices. These computing devices may include devices used for providing service or support to imaging devices identified to be in need of attention or immediate servicing (collectively referred to as service technician devices 130 in FIG. 1). Imaging device 101, database 150, and/or server 120 may include a variety of solutions thereon, as will be known to skilled artisans.

Figure 2:
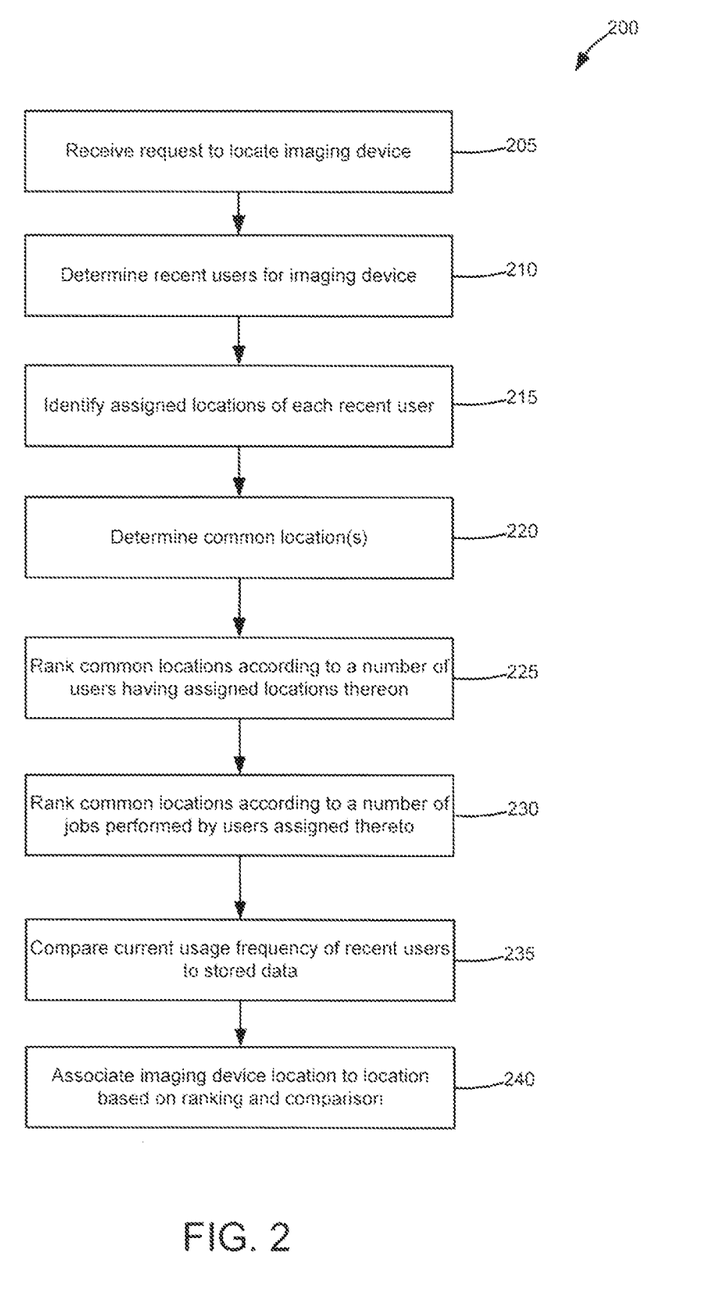
FIG. 2 is a flowchart showing one example method for determining a location of an imaging device according to the system in FIG. 1.
Figure 3A:
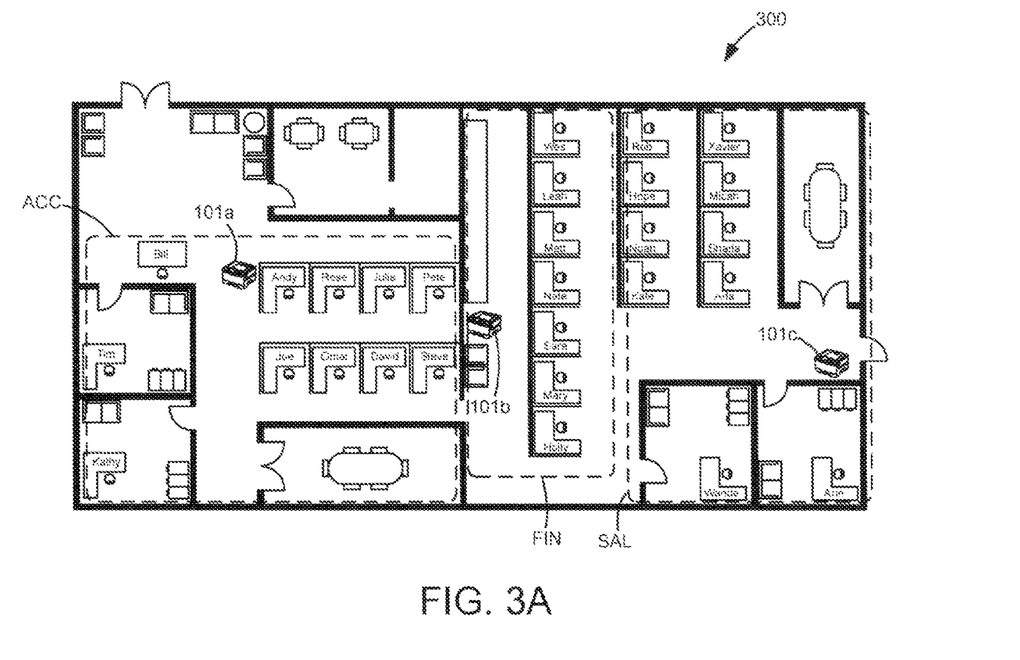
FIGS. 3A and 3B show representative movements of imaging devices in an organization.
Figure 3B:
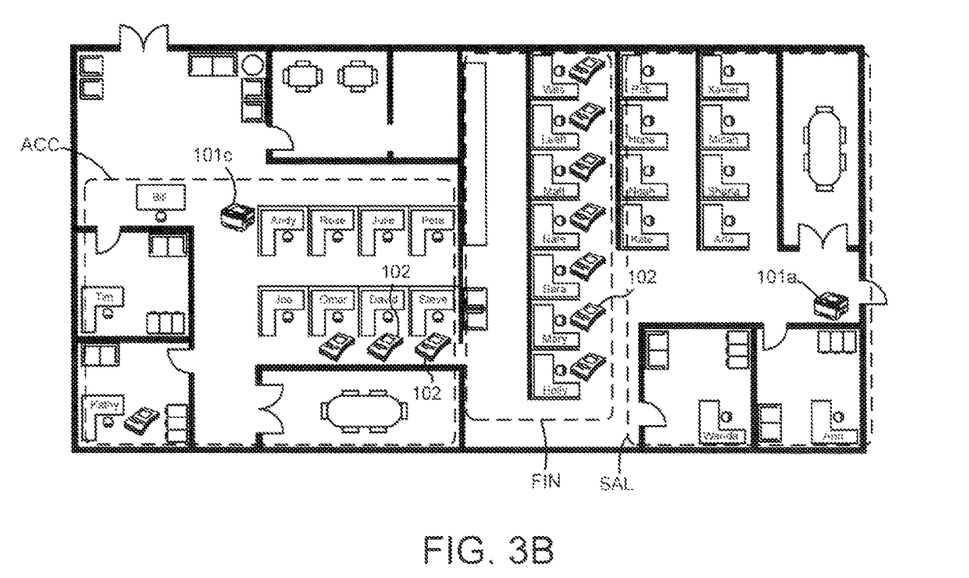

FIG. 2 shows a method 200 of determining locations of imaging devices based on the locations of its users. By way of example, the steps in FIG. 2 will be accompanied by FIGS. 3A-3B and 4A-4B. FIGS. 3A and 3B show a representative floor plan set-up 300 of an organization. For purposes of brevity, the "Accounting", "Finance", and "Sales" departments in an example organization may be referred therein as ACC, FIN, and SAL, respectively, as enclosed in dashed boxes and indicated on table 152 of FIG. 1. Particular users are positioned in each department, as indicated on tables 155a, 155b, and 155c stored in database 150 (FIG. 1). In one example, user "Tim" (indicated as 156, table 155a) is assigned on the 'first' office on the "Accounting" department. As such, Tim's location may be indicated as OFC1X in database 150. Of course, other formats for identifying a particular location in an organization are apparent in the art.

FIG. 3B shows the transfer of imaging devices 101a and 101c to SAL and ACC departments, respectively, and the removal of imaging device 101b. Imaging device 101c may be shared among users in the FIN and SAL departments. Since imaging device 101b can be automatically disconnected from computing system environment 100, there may be no need to determine its location based on its user log. Steps 205 to 225 for determining the locations of imaging devices 101a and 101c based on recent users thereof will now be detailed below.

At 205, server (120) receives a request to locate an imaging device from the fleet administrator (121). The request may include at least identifier (106) of the imaging device being located which may be, for example, a make or model number of imaging device (101). In one aspect, a plurality of imaging devices (101) may be requested to be located and at least an identifier of each of the plurality of imaging devices may be indicated in the request.

When the identifier of an imaging device is unknown, a list of imaging devices owned by the organization may be generated for selection by the fleet administrator or the service technician. Generating the list may be based on a type of imaging device/s to be located. For example, the user or requestor may indicate in the request to locate all multifunction printers in the organization. Another example may be to indicate in the request the need to locate all printers that are capable of performing a particular enterprise solution. In these example contexts, what are listed out are the imaging devices that satisfy the criteria and their respective locations within the organization.

In making the request, application (128) may be executed on server 120 (see FIG. 1). Application (128) may be any application for execution on server (120) for users or requestors to interface with operating system (124) of server (120) for providing instructions to code (126) thereon. Application (128) may be a command prompt, a pre-installed application specific to server (120), a web application, or any other similar applications that users may utilize to make a request.

In another aspect, a request to locate an imaging device in the organization may be set on preset intervals. Instead of determining an imaging device location at one-time, a location of the same device may be determined every after a particular period, such as, for example, after every 5 months since a last request has been made. In this context, a rate of transfer or disposition of imaging devices within an organization is considered. For example, it may be well-known in the organization that imaging devices are typically moved to different departments every 3 months (e.g., January, April, July, October). To avoid having to manually locate each imaging device, code (126) on server (120) may be triggered to determine a location of identified imaging devices every 3 months.

Figure 7:
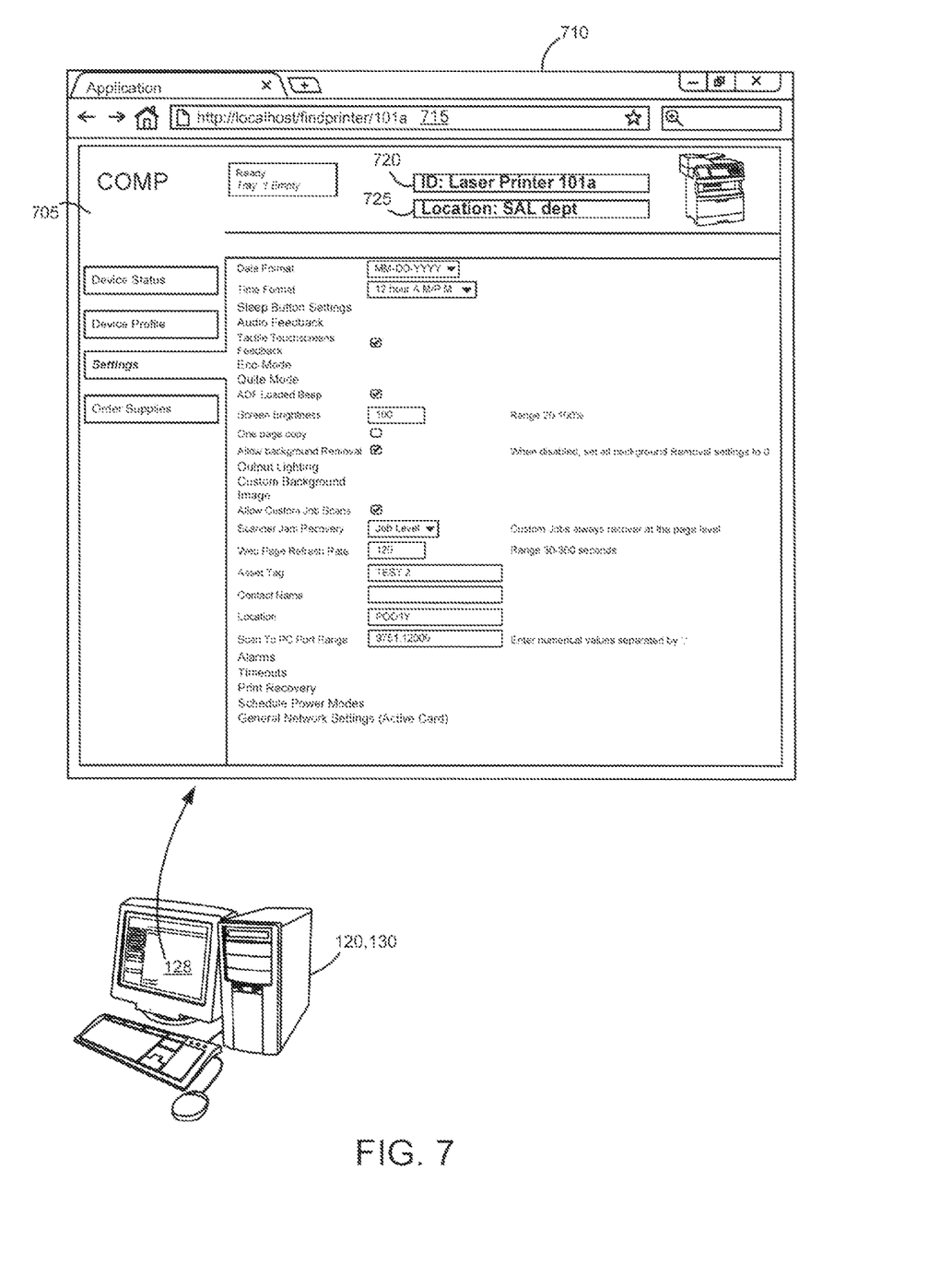
FIG. 7 shows an example application display for determining device location, status, profile, and like information.

In FIG. 7, a representative application (128) is illustrated. Application (128) is a web page (705) being accessed on web browser (710) running on server (120). Fleet administrator (121) may provide a link or address (715) in the address bar. Said link or address may lead to web page (505) to be executed. Web page (705) includes a profile including detailed information of the particular imaging device being located, which in this particular example is Laser Printer 101a (labeled 520). Upon entry of link or address (715) on web browser (710), a request may be sent to server (120) and code (126) may be executed for determining a location of imaging device having identifier "Laser Printer 101a". Other methods for making requests concerning device searches within an organization will be known in the art.

In response to such request, at 210, code (126) determines the recent users for the imaging device identified on the request. As will be known to skilled artisans, recent users are identified in a user log associated with an imaging device. A user log may include at least a list of user identifiers (108)

each associated with a respective user in the organization. The user log may also include other information associated with each user identified on the retrieved user log, such as, for example, a total number of imaging operations (hereinafter "jobs") that each respective user has performed on the device, date and time associated with at least the latest job performed by the user, a number of media sheets involved in the job, data associated with the file, and like information. For purposes of the present disclosure, a job herein refers to an instant a particular imaging device has been utilized by the user regardless of a number of media sheets involved.

As is typical, a user log may include independent and redundant row entries which indicate each user identifier and the date and time to which respective jobs have been performed thereon. FIGS. 4A-4B show example user logs 102a and 102c associated with imaging devices 101a, and 101c, respectively. For purposes of discussion, user logs 102a and 102c may include a list of users who have performed printing operations on respective imaging devices 101a and 101c. In FIGS. 4A and 4B, each row or entry on the user logs indicate one printing job performed by a corresponding user. With reference to the example scenario on FIGS. 3A and 3B, the switching of locations of imaging devices 101a and 101c and the removal of imaging device 101b may be performed by the organization on Jan. 21, 2015. A request to locate imaging devices 101a and 101c may be received from fleet administrator (121) of server (120) (FIG. 1) on January 24. Accordingly, upon such a request, user logs 102a and 102c are determined and include a list of users and the date and time to which each printing job has been performed within the week of Jan. 19-23, 2015.

Figure 5A:
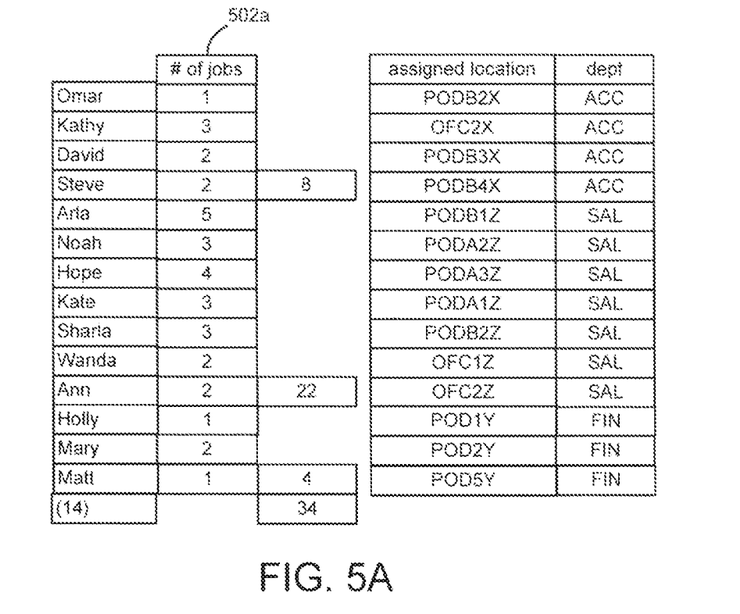
FIGS. 5A and 5B show user logs filtered according to a number of jobs performed by each user.
Figure 5B:
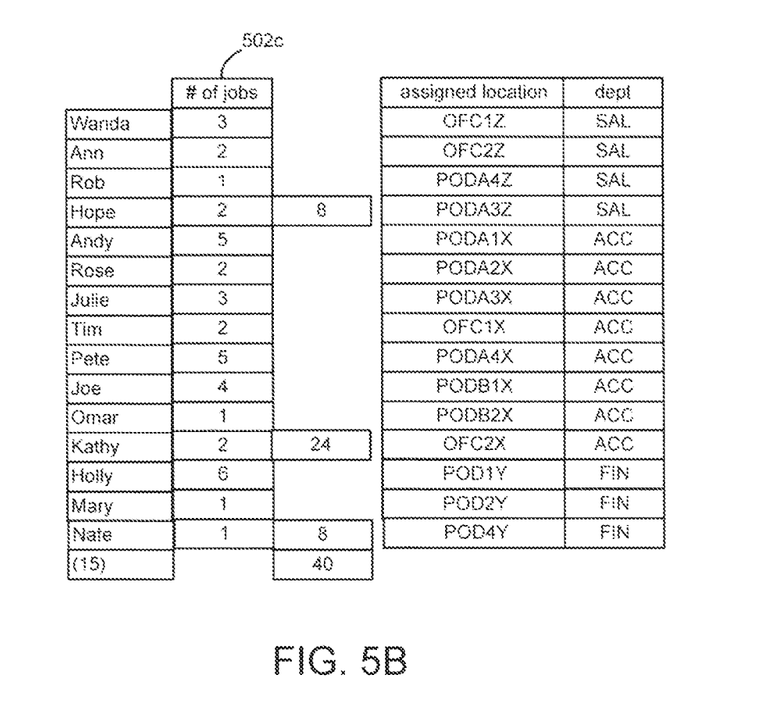

In retrieving a user log associated with an imaging device, the user log may be filtered. In filtering a user log, a number of jobs performed by a user as indicated by each row or entry in a user log are being counted. The total number of jobs performed by each respective user or unique user identifier 108 indicates how frequent a user utilizes an imaging device. The number of jobs is also being used to determine whether or not the imaging device has been transferred to another location. FIGS. 5A and 5B show filtered data from user logs 102a and 102c on FIGS. 4A and 4B. While user logs 102a and 102c (see FIGS. 4A and 4B) lists out users according to the date and time to which they have been performed as is typical in user logs of imaging devices, each row or entry on filtered user logs 502a and 502c (see FIGS. 5A and 5B) indicate a user and a number of jobs they have performed based on the entries on user logs 102a and 102c. In one example, user "Omar" may have been identified to have performed a total of 5 jobs at separate instances prior the request at 205.

At 215, server (120) queries database (150) for the assigned location of each user indicated in the user log. Server (120) may send each user identifier indicated on the log to the database for the database to determine a location in the organization associated to that user identifier. In filtered user log 502a on FIG. 5A, user "Omar" is found in database 150 and is identified to be an assigned on PODB2X (table 155a, FIG. 1), while user "Noah" may be identified to be assigned in PODA2Z. Meanwhile on user log 502c (FIG. 5B) associated with imaging device 101c, user "Hope" may be identified to be assigned in PODA3Z, while user "Joe" may be identified to be assigned in PODB1X.

At 220, server (120) then determines one or more locations common among the assigned locations of the recent users in the log and at 225, ranks the determined locations according to a number of users in each location. As aforementioned and for purposes of the present disclosure, a common location refers to an area or department to which an assigned location of a user belongs to. In determining a common location (e.g., area or department) among users identified in a user log, a location of the imaging device within the organization is being narrowed.

While the assigned locations of a user may be indicative of a department in which the user belongs to, an assigned location of a user may be the department itself. For example, user "Omar" may be identified by database 150 to be assigned in the Accounting department instead of a particular cubicle. In this context, the organization may be small and/or the users may be operative to be transferring from one to another specific location within a department. However, with reference to user log 502a on FIG. 5A, users "Omar", "Kathy", "David", and "Steve" may be identified to have assigned locations in the Accounting (ACC) department; users "Steve", "Arla", "Noah", "Hope", "Kate", "Sharla", "Wanda", and "Ann" may be identified to have assigned locations in the Sales (SAL) department; and users "Holly", "Mary", and "Matt" may be identified to have assigned locations in the Finance (FIN) department. Since users in an organization typically utilize imaging devices that are closest to them, the higher the number of users is from a common location as indicated in the identified user logs, the more likely the imaging device is located on the common location. From the list of users on user logs 502a, it may be then identified that the Sales department has the highest number of users (7), followed by the Accounting department (4), and then the Finance department (3).

In the case of imaging device 101c, based on user log 502c on FIG. 5B, users "Wanda", "Ann", "Rob", and "Hope" may be identified to have assigned locations in the Sales (SAL) department; users "Andy", "Rose", "Julie", "Tim", "Pete", "Joe", "Omar", and "Kathy" may be identified to have assigned locations in the Accounting (ACC) department; users "Holly", "Mary", and "Nate" may be identified to have assigned locations in the Finance (FIN) department. From such entries, it may then be identified that the Accounting department has the highest number of users (8), followed by the Sales department (4), and then the Finance department (3).

While a frequency of users may be indicative of where an imaging device may likely be located, other factors such as a number of jobs performed by users and their usage patterns relative to previously identified logs are also to be considered as will be detailed in the following steps. Since the number of users for a first and a second identified common location may be equal in number, putting the other aforementioned factors in consideration would further narrow the search for a location of a particular imaging device.

In one example, upon determination of a ranking of common locations according to a number of users having assigned locations thereof, at 230, the common locations are further ranked according to a number of jobs performed by the identified users thereto. As common locations may be alike in ranking at 225, further ranking the locations according to usage frequency of its users would help identify the most likely location for the imaging device. Since users located closer to an imaging device typically perform more jobs thereon relative to users from another location, a number of jobs performed by users or usage frequency per common location may also be taken into account.

With reference back to FIG. 5A, a total of 34 jobs may be performed by all the users of imaging device 101a within the week of Jan. 19-23, 2015 except on the date to which it has been moved (January 21). From the 34 jobs, 8 of which are performed by users from the Accounting department; 22 from the Sales department; and 4 from Finance. Since most of the 14 users in user log 102a and most of the 34 jobs performed are both from the Sales department, it can be said that the imaging device is located in the Sales department.

Similarly, on FIG. 5B, a total of 40 jobs have been performed by all the users of imaging device 101c. From 40, 8 of which are performed by users from the Sales department; 24 of which are from the Accounting department; and 8 of which are from Finance. Since most of the 15 users in user log 102c and most of the 40 jobs performed thereon are both from the Accounting department, it can be said that the imaging device is located in the Accounting department.

In a case where common locations are ranked differently at 225 (according to a number of users assigned thereto) and at 230 (according to a number of jobs performed by the assigned users in total), code (126) determines which among the common locations are ranked higher at 225. In this context, a number of unique users from a department are considered more in associating with a location of the imaging device than a number of jobs performed in the department. Alternatively, a number of jobs performed by users from a particular location may be given more weight than the number of users in that particular location. However, which of these two factors are given more weight may depend on a size of the organization.

To further determine a location of a particular imaging device within an organization, the user log determined at 210 may be compared to one or more previously identified user logs (step 235, FIG. 2). The step of comparing may include determining whether or not a particular user has performed at least one job on the imaging device, and if so, identifying whether a number of jobs performed by said user has increased or decreased. In comparing a current user log to previously identified logs, a usage pattern among users of a particular imaging device is being detected. Via comparison of previously identified data to the recent data, it can then be observed whether usage frequency of each of a plurality of users has increased or decreased overtime. When the usage pattern for a particular set of users has been determined to be increasing, a location of the imaging device may then be associated to a location common among this particular set of users. Otherwise, when a usage pattern for a particular set of users has been decreasing, it can be said that the imaging device has been moved from a location of this particular set of users. Of course a number of users in a common location (at 225) and/or number of jobs performed by these users (at 230) can still be taken into consideration. User logs associated with a particular imaging device and/or information thereon may be stored on memory 123 and/or on database 150 for later comparison.

Figure 6A:
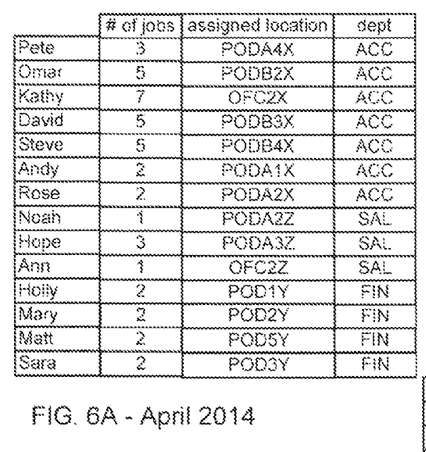
FIGS. 6A-6D show a comparison of user logs for tracking usage pattern of users overtime.
Figure 6B:
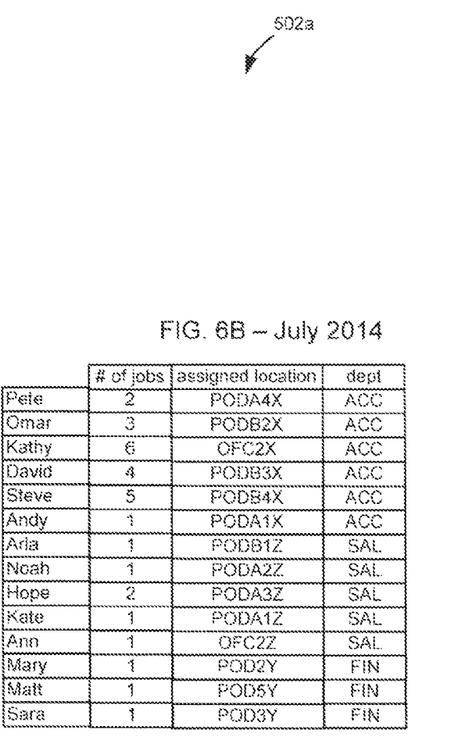
Figure 6C:
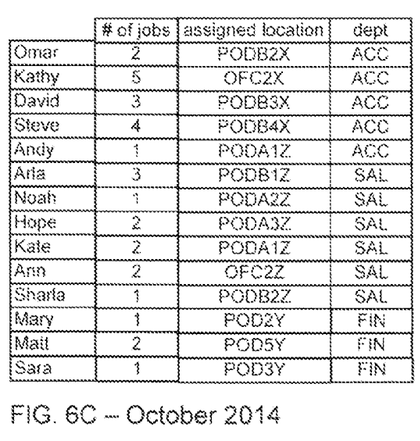
Figure 6D:
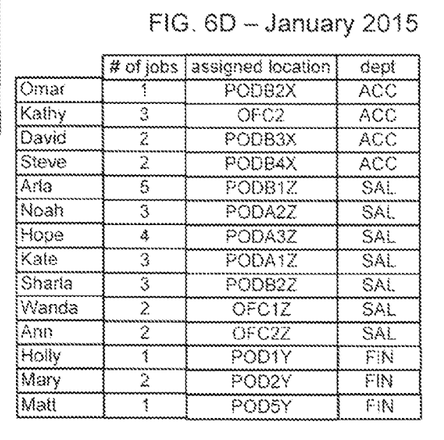

FIGS. 6A-6D show a set of user logs 602a, 602b, and 602c associated with imaging device 101a on April 2014, July 2014, October 2014, and January 2015, respectively. It is to be noted that FIG. 6D includes the same information as user log 502a on FIG. 5A. Information on FIG. 6D is operative to be compared with previously identified user logs 602a, 602b, and 602c. On FIG. 6A, a number of users from the Accounting department are not only greater than a number of users from the Sales and the Finance department, but the same users also produce the most number of jobs. As such, it can be said that on April 2014, imaging device 101a is located on the Accounting department. Similarly, using steps 225-240 on FIG. 2, based on data given on user logs 602b and 602c of FIGS. 6B and 6C, changes in the usage pattern of users thereon can be noted. With reference now on FIG. 6D and relative to user logs on FIGS. 6A-6C, a number of users from the Sales department have increased from 3 to 7 in a span of less than a year and a number of jobs performed from the Sales department has also increased in number.

Accordingly, a location of imaging device 101a may be associated with the Sales department (step 240, FIG. 2). In one aspect, a user log associated with an imaging device may indicate two common areas among recent users thereon. The accuracy of the location of imaging device 101 depends on the amount of user location information on database 150.

While steps 205-225 of flowchart 200 are described to be performed by server 120, imaging device 101 can also be configured to perform the same steps in another example embodiment. Specifically, if code 126 is configured to be activated on or from imaging device 101, imaging device 101 is operative to update its own location or self-report its current location to server 120. For example, a service technician accessing device (130) or user (104) of imaging device (101) may send a request to server (120) for determining a location of a particular imaging device (step 205). User log 102 associated with the imaging device being located may be retrieved by the imaging device from server 120, from memory 108 thereof, or on any other storage mechanisms where user logs in an organization may be accumulated and stored (step 210). Imaging device 101 may then communicate with database 150 for the assigned locations of each user in the user log (step 215) and determine a common location among its users (step 220). Finally, the imaging device may associate its location to a location most common among the users in the user log (step 225). Fleet administrator 121, care of server 120, may then be notified of the location of the imaging device based on the location of users thereof.

Alternatively, server (120) may be operative to track down whether or not assigned locations of users may be automatically determined as each is entered onto user log 102. Specifically, code 126 may be configured to determine an assigned location for each user as they are entered on the user log. A comparison may then be made between a latest identified location of the imaging device and the assigned location of each recent user to determine whether the imaging device has changed its location. From such comparison, a number of "new" users (referring to users from departments other than the latest identified location of the imaging device) are tracked, such that when the number of new users reaches a preset limit, it could be established that the imaging device has been moved.

Upon such association at step 225, when a new location of any imaging device 101 in an organization has been determined, the new location may be automatically updated on location field 725 of web page 505 (FIG. 7) for display to fleet administrator 121. Accordingly, service technicians ahold of devices 130 (FIG. 1) may be automatically informed of the change in location of the imaging device/s assigned to them by accessing web page 505. In general, at each time an imaging device 101 is moved, its location is automatically associated with its users and updated on database 150 for reference and usage on system 100.

Relative advantages of the many embodiments should now be apparent to skilled artisans. They include but are not limited to an induced location awareness mechanism in an imaging device based on its recent users. Since locations of imaging devices 101 are automatically determined based on locations of users thereof, searching for a location of an imaging device is made easier.

The foregoing illustrates various aspects of the invention. It is not intended to be exhaustive. Rather, it is chosen to provide the best illustration of the principles of the invention and its practical application to enable one of ordinary skill in the art to utilize the invention. All modifications and variations are contemplated within the scope of the invention as determined by the appended claims. Relatively apparent modifications include combining one or more features of various embodiments with features of other embodiments.

The invention claimed is:

1. A method for determining a location of a multifunction printer in an organization, comprising: determining a plurality of recent users of the multifunction printer; identifying an assigned location of each of the plurality of recent users in the organization; and associating a location of the multifunction printer to an area in the organization common among assigned locations of the plurality of recent users; determining whether or not the location of said each user matches that of a latest identified location of the multifunction printer; and upon a negative determination, tracking for a number of users of the multifunction printer having locations not matching that of the latest identified location of the multifunction printer, wherein it is established that the multifunction printer has changed its location when said number of users has reached a preset limit of two or more for new users.

2. The method of claim 1, wherein the determining the plurality of recent users includes receiving a request to locate the multifunction printer, the request including an identifier of the multifunction printer.

3. The method of claim 1, wherein the identifying the assigned location includes communicating with a directory for the assigned location of said each of the plurality of recent users in the organization.

4. The method of claim 1, further comprising performing said determining step by one of the multifunction printer and a server communicatively coupled to the multifunction printer.

5. The method of claim 1, wherein the associating the location of the multifunction printer includes grouping the plurality of recent users based on a commonality in locations of the plurality of recent users, the location of the device multifunction printer being based upon a number of users in said grouping.

6. The method of claim 1, further comprising reporting, by the multifunction printer, the location to a server communicatively connected thereof when said steps of determining, identifying, and associating are performed by the multifunction printer.

7. A system for determining locations of multifunction printers in an organization, comprising: one or more multifunction printers for a plurality of users of the organization to perform one or more imaging operations thereon; and a server communicatively coupled to each of the one or more multifunction printers, wherein one of the one or more multifunction printers and the server has a controller including executable instructions configured to determine a plurality of recent users of each multifunction printer of the one or more multifunction printers; identify an assigned location of each of the plurality of recent users in the organization; associate a location of said each multifunction printer to an area common to the assigned locations of the plurality of recent users thereof; determine whether or not the location of said each user matches that of a latest identified location of the multifunction printer; and upon a negative determination, track for a number of users of the multifunction printer having locations not matching that of the latest identified location of the multifunction printer, wherein it is established that the multifunction printer has changed its location when said number of users has reached a preset limit of two or more for new users.

8. The system of claim 7, wherein one of the one or more multifunction printers and the server is further operative to receive a request to locate an multifunction printer in the organization, the request for activating said executable instructions to determine, identify, and associate.

9. The system of claim 7, further including a directory having stored thereon an assigned location of each of the plurality of users in the organization and communicatively coupled with the one or more multifunction printers and the server.

10. The system of claim 7, wherein the server is further operative to query a directory for the assigned location of each of the plurality of recent users in the organization.

11. The system of claim 7, wherein the server is further operative to store location information of each of the plurality of users in the organization.

12. The system of claim 7, further including an application communicatively coupled to the one of the one or more multifunction printers and the server for interfacing by a user in locating the one or more multifunction printers.

13. The system of claim 7, wherein said executable instructions are configured to update a stored location of said imaging device in the organization based on the association.

14. A method for detecting change in location of an multifunction printer in an organization, comprising: detecting each user of the multifunction printer; identifying a location of said each user in the organization; determining whether or not the location of said each user matches that of a latest identified location of the multifunction printer; and upon a negative determination, tracking for a number of users of the multifunction printer having locations not matching that of the latest identified location of the multifunction printer, wherein it is established that the multifunction printer has changed its location when said number of users has reached a preset limit of two or more for new users.

15. The method of claim 14, wherein the identifying the location includes querying a directory for the location of said each user in the organization.

16. The method of claim 14, further including sending an alert indicative of a pending change in location of the multifunction printer upon a negative determination that the location of said each user matches that of the latest identified location of the multifunction printer.

17. The method of claim 14, further including associating a location of said multifunction printer to an area in the organization most common among locations of said each user of the multifunction printer.

18. A method for determining a location of one or more multifunction printers in an organization, comprising: determining, by a server connected to the one or more multifunction printers, a user log for each multifunction printer of the one or more multifunction printers being located in the organization; communicating with a user location directory for an assigned location of each of a plurality of recent users in the user log; and associating a location of said each multifunction printer to an area in the organization common among the assigned locations of the plurality of recent users; and determining whether or not the location of said each user matches that of a latest identified location of the multifunction printer; and upon a negative determination, tracking for a number of users of the multifunction printer having locations not matching that of the latest identified location of the multifunction printer, wherein it is established that the multifunction printer has changed its location when said number of users has reached a preset limit of two or more for new users.

19. The method of claim 18, further including updating a stored location of the multifunction printer to indicate the location associated with the area in the organization common among the assigned locations of the recent users.

20. The method of claim 18, wherein the associating the location of said each multifunction printer includes identifying an area in the organization having a highest number of recent users assigned thereon.

* * * * *